April 10, 1945.  L. W. IMM  2,373,566
BALANCE COMPUTER
Filed Feb. 25, 1941  4 Sheets-Sheet 3
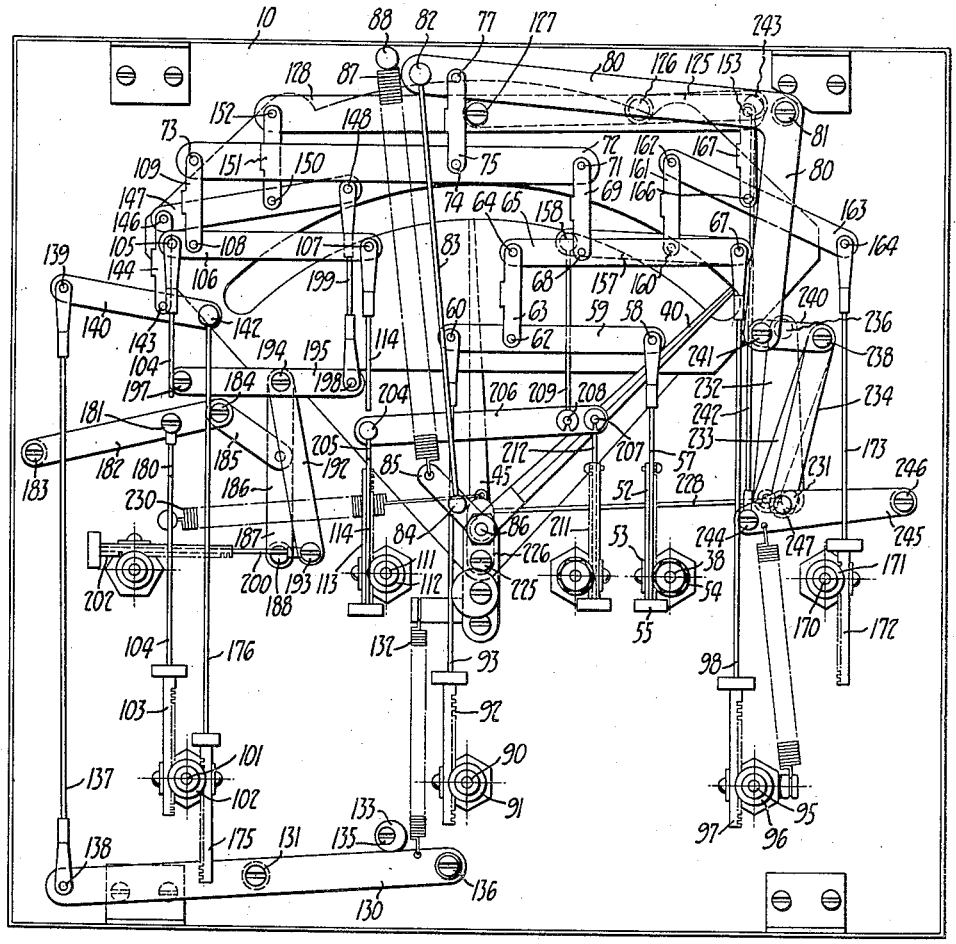
FIG_3_
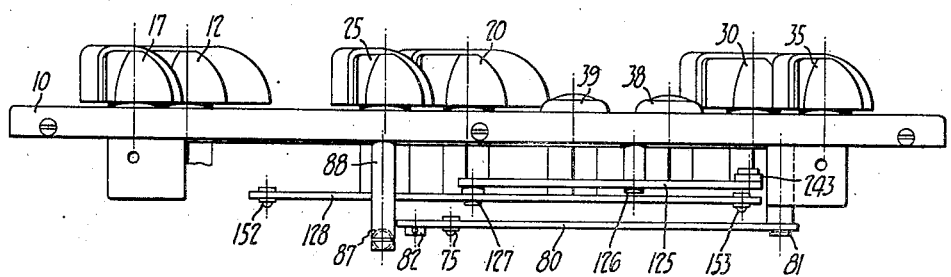
FIG_4_
INVENTOR
Lewis W. Imm
BY Taylor and Lerague
ATTORNEYS

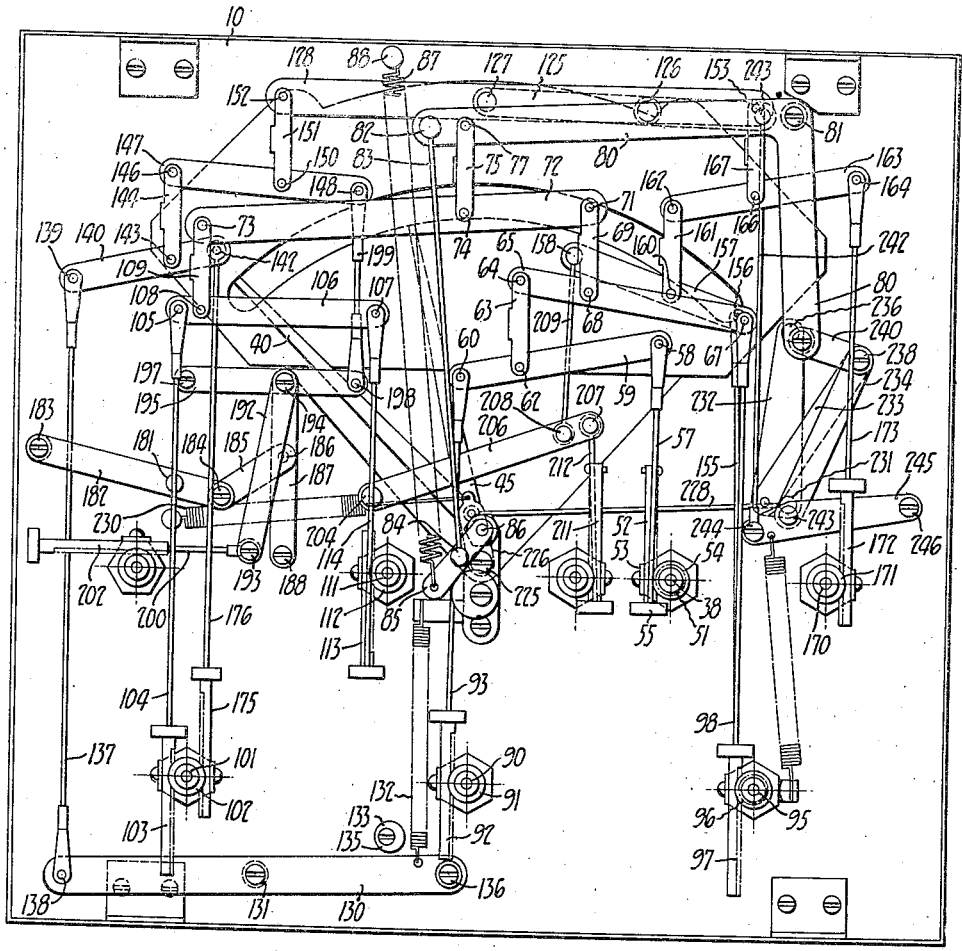
FIG_2_
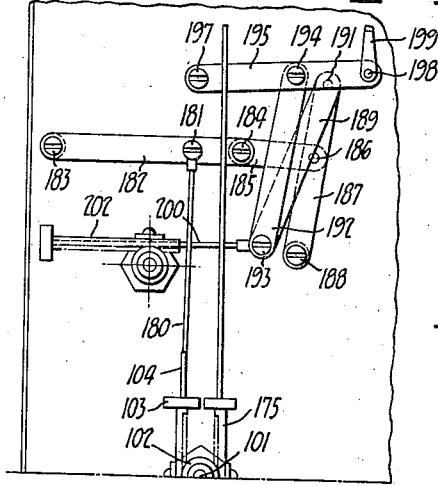
FIG_7_

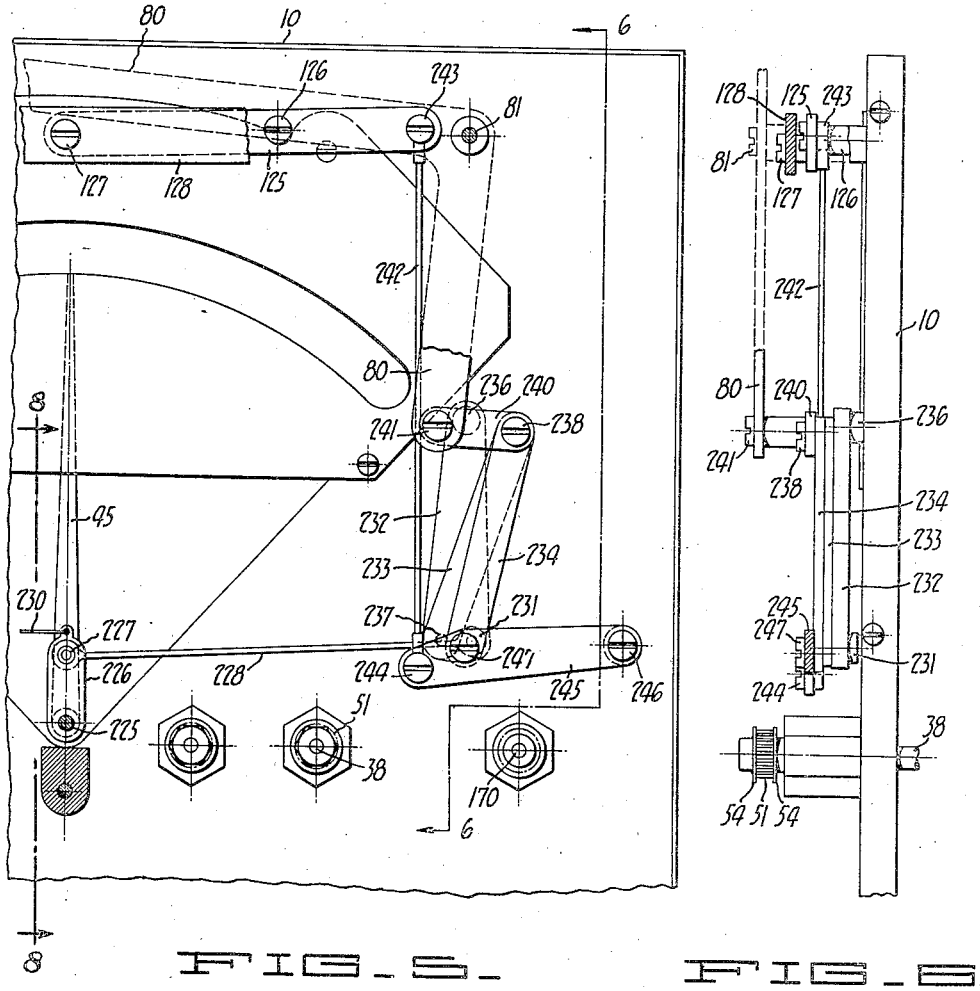
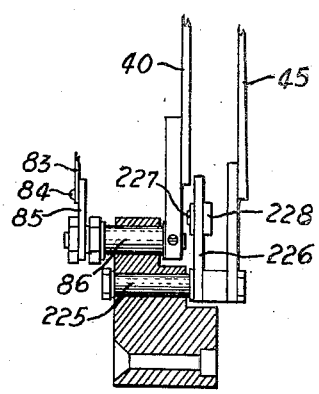

Patented Apr. 10, 1945

2,373,566

UNITED STATES PATENT OFFICE 2,373,566

BALANCE COMPUTER

Lewis W. Imm, Glendale, Calif., assignor to Librascope, Incorporated, Burbank, Calif., a corporation of California Application February 25, 1941, Serial No. 380,487

8 Claims. (Cl. 235—61)

The present invention relates to computing mechanisms and has as its principal object the improvement of balance computers of the general character disclosed in my prior patent number 2,179,822 issued November 14, 1939, although certain of the mechanisms included in the instrument herein disclosed are useful in computers adapted for other uses.

Prior to the commercial introduction of instruments embodying the invention disclosed in my prior patent, above identified, which are known commercially as "Librascope" balance computers, the loading of transport planes, bombers, and similar aircraft required extended longhand computations for determining gross weight and the fore and aft position of the load center for each particular distribution of the weights making up the load. The invention disclosed in said prior patent, however, provide a computer for automatically indicating variations in the location of the load center with cargo stowed and passengers and crew stationed in various locations with respect to the normal load center of the craft.

The specific objects of the present invention include reduction of the number of settable devices which the operator is required to adjust in computing the load center location for a given weight distribution, provision for indication of the effect upon load center location of the shifting of weights already entered, without requiring alteration of the weight settings, and mechanical improvement and simplification of the computing mechanism controlling the indicating devices.

The foregoing, together with other objects of the invention, preferably are accomplished by the provision of a control board carrying a single settable device for each of a plurality of classes of loads, e. g., passengers and cargo, regardless of their distribution within the spaces provided therefor, and the provision in combination therewith of associated settable devices for indicating changes in the respective positions of each of said classes of loads without altering the settings of the former devices. Additional settable devices are provided for other classes of loads, e. g., fuel and oil, and any or all of these latter devices may be utilized to indicate the total weight of a load of a given class even though it is distributed in a plurality of tanks in different locations with respect to the normal load center of the craft, provided only that such tanks are to be filled and emptied in a predetermined order. This reduction in the number of settable devices makes possible the simplification of the computing mechanism as hereinafter described in detail.

The novel features of the invention are set forth with particularity in the appended claims. The invention itself, however, together with additional objects and advantages thereof will be best understood from the following description of a specific embodiment, when the same is read in connection with the accompanying drawings, in which:

Figures 2 and 3 are rear views of the panel of Figure 1 illustrating the computing mechanism mounted thereon;

Figure 4 is a plan view of the panel illustrating portions of both the controls and the computing mechanism;

Figure 5 is a detail view of a portion of the computing mechanism;

Figure 6 is a detail view, partly in section, taken along the line 6—6 of Figure 5;

Figure 7 is a detail view of the mechanism associated with the passenger load setting mechanism; and Figure 8 is an elevational view, partly in cross section, taken on the line 8—8 of Figure 5, and looking in the direction of the arrows.

Figure 1:
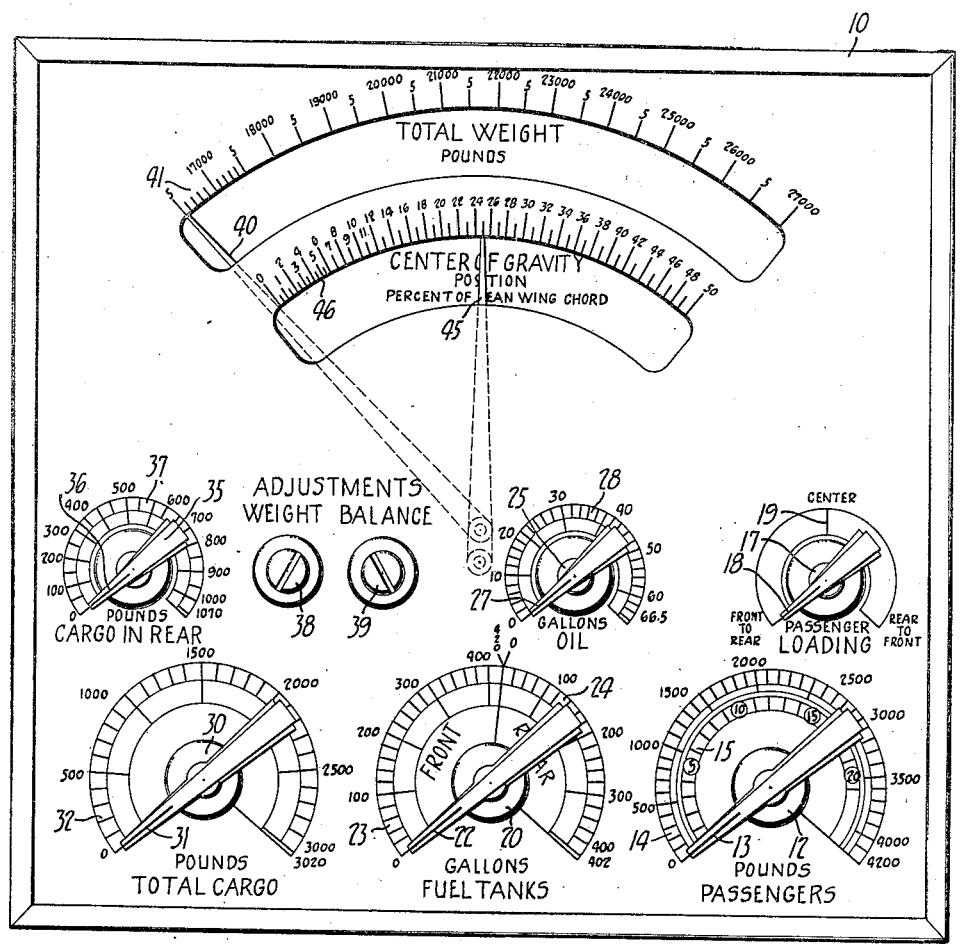
Figure 1 is a front view of the control panel of an instrument embodying the present invention.

As shown in Figure 1, the panel 10 carries the several manually operable devices for setting the various weights and weight distributions into the instrument, and also the scales with reference to which pointers are moved to indicate the total weight of the craft and its load, and the location of the load center in terms of percentage of the mean wing chord of an airplane.

A single rotatably mounted knob 12 is provided on the panel 10 for entering the number of passengers to be carried, a predetermined average weight for each passenger usually being assumed, and said knob has an indicating portion 13 movable with respect to a weight scale 14 and a passenger number scale 15 so that the weight and number of passengers will be approximately indicated upon rotation of the knob to a selected position.

Adjacent thereto on the panel 10 there is rotatably mounted a passenger weight distribution knob 17 having an indicating portion 18 movable with respect to a weight distribution scale 19 so that the seated positions of the passengers, which may be from front to rear, rear to front, or outwardly from the center of the cabin, will be indicated upon rotation of this knob to a selected position. It is only when there are to be empty passenger seats that the adjustment of this knob will affect the load center indicator, but when there are empty seats, this knob is used not only to obtain an accurate indication of the location of the load center upon seating of the passengers according to one of the above three plans indicated, but also to indicate the effect upon load center location of reseating the passengers according to an alternate plan at any time.

At the lower center of the panel 10 a fuel weight and distribution knob 20 is rotatably mounted, said knob having an indicating portion 22 movable with respect to joined weight scales 23 and 24 relating to the front and rear fuel tanks respectively. The front fuel tank is filled first and the rear tank is emptied first in the loading procedure followed when this instrument is in use, making it possible to thus effect a single entry representing both the weight and distribution of fuel by rotation of the knob 20 to a selected position with respect to scales 23 and 24 which are calibrated, preferably, in gallons.

At the lower left portion of the panel a cargo weight knob 30 is rotatably mounted, said knob having an indicating portion 31 movable with respect to a scale 32 so that the total weight of cargo to be loaded in both the front and rear cargo spaces will be indicated upon rotation of the knob to a selected position.

Adjacent thereto on the panel 10 there is rotatably mounted a cargo weight distribution knob 35 having an indicating portion 36 movable with respect to a weight distribution scale 37 so that the amount of the cargo which is disposed in the rear cargo space of the craft will be indicated by rotation of the knob 35 to a selected position. It should be understood that setting movement of knob 35 does not represent the addition of cargo weight to the load previously set by rotation of knob 30, but merely indicates the relative distribution, as between the front and rear cargo spaces, of the cargo weight indicated by the position of the indicating portion 31 of knob 30 with respect to scale 32. Therefore the knob 30 must always be set to a weight indication equalling or exceeding that of knob 35.

A rotatably mounted knob 25 is also provided on the panel 10 for entering the weight of the oil load, said knob having an indicating portion 27 movable with respect to a scale 28 calibrated in gallons.

The empty weight of the airplane, usually with its crew, is entered by rotation of a shaft provided with a slotted end 38 and may be corrected from time to time. Similarly, the normal location of the load center may be altered from time to time, and a second shaft provided with a slotted head 39 is therefore provided for resetting the load center location indicator under such circumstances.

The foregoing constitutes the settable devices by means of which the computing mechanism is controlled to give an indication of the total weight of the craft and its load by moving pointer 40 with respect to scale 41, and to give an indication of the location of the center of gravity of the loaded craft by moving pointer 45 with respect to its scale 46.

The computing mechanism can be best understood by regarding it as consisting of first, a weight totalizing portion controlled by the knobs 12, 20, 25, and 30; second, a moment computing and totalizing portion controlled by the knobs 12, 17, 20, 25, 30, and 35; and finally, a portion controlled jointly by the weight and moment totalizing portions, for computing the lineal displacement of the center of gravity and indicating the state of balance of the craft.

The weight totalizing portion serves to add to the empty weight of the craft the weights of passengers, fuel, oil, and cargo corresponding to the settings of knobs 12, 20, 25, and 30; the empty weight being first entered by adjustment of slotted shaft 38 until pointer 40 is properly positioned with respect to its scale 41.

For the purpose of adjusting the pointer 40 to an accurate indication of the empty weight of the craft, the end of shaft 38 at the rear of panel 10 (Figures 2 and 3) has fixed to it a gear 51 (see also Figure 6) meshing with a rack 52 which is held in engagement with the gear by a guide member 53 fixed to the panel 10, flanges 54 fixed to the gear and overlapping the edge of the rack, and a block 55 secured to the end of the rack. This arrangement is typical of that utilized for the connection of all the racks and knobs hereinafter described, and therefore no detailed description of such similar connections will be given.

Fixed to the block 55 is a flexible rod 57 pivotally connected at 58 to a link 59 which in turn is pivotally supported at 60 on a pivot which may be regarded as fixed for the purpose of the present portion of the description. Link 59 is pivotally connected at 62 to a connector 63, the upper end of which is pivotally connected at 64 to a link 65 supported at 67 on a pivot which may be regarded as fixed for the purpose of the present portion of the description. Link 65 is pivotally connected at 68 to a connector 69, the upper end of which is pivotally connected at 71 to a link 72 supported at 73 on a pivot which may be regarded as fixed for the purpose of the present portion of the description. Link 72 is pivotally connected at 74 to a connector 75, the upper end of which is pivotally connected at 77 to a weight total registering element consisting of a bellcrank 80 pivotally mounted at 81 on the panel 10.

For the purpose of visually indicating the weight total registered by displacement of bellcrank 80, a pointer 40 is directly adjusted by movement of the bellcrank 80 on its pivot 81. For this purpose bellcrank 80 is pivotally connected at 82 to a flexible rod 83, the lower end of which is pivotally connected at 84 to an arm 85 secured to a shaft 86 upon which the pointer 40 is likewise secured. Spring 87, tensioned between the arm 85 and a stud 88 in panel 10, tends to move pointer 40 toward the lower end of its scale 41, taking up in one direction any back lash or lost motion in the train of connections between the pointer and the settable devices connected to it.

For the purpose of adjusting the pointer 40 to indicate the weight of the fuel load in addition to the empty weight of the craft and the other loads, the knob 20 is fixed to a shaft 90 (Figures 2 and 3) journaled in the panel 10 and provided with a gear 91 fixed to the end thereof at the rear of panel 10. Held in mesh with gear 91 by an arrangement corresponding to that previously described, is a rack 92 to which is fixed a flexible rod 93 pivotally connected at 60 to the previously described link 59.

This arrangement is such that upon clockwise movement of knob 20 (Figure 1), rack 92 and rod 93 are moved downwardly, rocking link 59 about pivot 58 as a fixed pivot, link 65 about pivot 67 as a fixed pivot, link 72 about pivot 73 as a fixed pivot, and bellcrank 80 about its pivot 81, to produce clockwise movement of pointer 40 as the same is viewed in Figure 1. The lengths of the effective lever arms in this train are fixed so that the advance of pointer 40 with respect to its scale 41 will be proportionate to the weight of the volume of fuel indicated by the position of indicator 22 with respect to scales 23 and 24 in all positions of knob 20.

For the purpose of adjusting the pointer 40 to indicate the weight of the cargo load in addition to the empty weight of the craft and the other loads, the knob 30 is fixed to a shaft 95 (Figures 2 and 3) journaled in the panel 10, and provided with a gear 96 fixed to the end thereof at the rear of the panel 10. Held in mesh with gear 96 by an arrangement corresponding to that previously described is a rack 97 to which is fixed a flexible rod 98 pivotally connected at 67 to the previously described link 65.

This arrangement is such that upon clockwise movement of knob 30 (Figure 1), rack 97 and rod 98 are moved downwardly rocking link 65 about 64 as a fixed pivot, link 72 about pivot 73 as a fixed pivot, and bellcrank 80 about its pivot 81, to produce clockwise movement of pointer 40 as the same is viewed in Figure 1. The lengths of the effective lever arms in this train are fixed so that the advance of pointer 40 with respect to its scale 41 will be proportionate to the weight of the cargo indicated by the position of indicator 31 with respect to scale 32 in all positions of knob 30.

For the purpose of adjusting pointer 40 to indicate the weight of the passenger load in addition to the empty weight of the craft and the other loads, the knob 12 is fixed to a shaft 101 (Figures 2 and 3) journaled in the panel 10 and provided with a gear 102 fixed to the end thereof at the rear of the panel 10. Held in mesh with gear 102 by an arrangement corresponding to that previously described, is a rack 103 to which is fixed a flexible rod 104 pivotally connected at 105 to a link 106 supported at 107 on a pivot which may be regarded as fixed for the purpose of the present portion of the description. Link 106 is pivotally connected at 108 to a connector 109, the upper end of which is pivotally connected at 73 to the previously described link 72.

This arrangement is such that upon clockwise movement of knob 12 (Figure 1), rack 103 and rod 104 are moved downwardly rocking link 106 about 107 as a fixed pivot, link 72 about 71 as a fixed pivot, and bellcrank 80 about its pivot 81, to produce clockwise movement of pointer 40 as the same is viewed in Figure 1. The lengths of the effective lever arms in this train are fixed so that the advance of pointer 40 with respect to its scale 41 will be proportionate to the total of the assumed average weights of the number of passengers indicated by the position of indicator 13 with respect to scale 15 in all positions of knob 12.

For the purpose of adjusting pointer 40 to indicate the weight of the oil load in addition to the empty weight of the craft and the other loads, the knob 25 is fixed to a shaft 111 (Figures 2 and 3) journaled in the panel 10 and provided with a gear 112 fixed to the end thereof at the rear of the panel 10. Held in mesh with gear 112 by an arrangement corresponding to that previously described is a rack 113 to which is fixed a flexible rod 114 pivotally connected at 107 to the previously described link 106.

This arrangement is such that upon clockwise movement of knob 25 (Figure 1) rack 113 and rod 114 are moved downwardly rocking link 106 about 105 as a fixed pivot, link 72 about 71 as a fixed pivot, and bellcrank 80 about its pivot 81, to produce clockwise movement of pointer 40 as the same is viewed in Figure 1. The lengths of the effective lever arms in this train are fixed so that the advance of pointer 40 with respect to its scale 41 will be proportionate to the weight of the volume of oil indicated by the position of indicator 27 with respect to scale 28 in all positions of knob 25.

Because the several classifications of loads designed to be carried are not ordinarily of the same magnitude, the calibration of the scales associated with the various knobs will not usually be on the same scale. The movement imparted to the pointer 40 by each knob is controlled by the lever systems connecting the knobs with the pointer, however, so that the advance of the pointer with respect to its scale corresponds with the advance of each knob with respect to its scale, and in instruments designed for various types of aircraft the calibrations and lever systems may be altered in accordance with the capacities and weight locations involved.

It will be observed that although for the purposes of explanation the various levers have been described as rocking about designated points as fixed pivots, this is true only when the knobs are set separately, the frictional resistance of the other knob assemblies preventing their displacement under such circumstances. All of the lever systems are so constructed, as shown in the drawings, as to permit any number of the knobs to be set concurrently, and under such circumstances the pointer will be advanced proportionately to the sum of the individual knob movements.

The various weights making up the load of the craft being totalized and added to the empty weight of the craft by the mechanism thus far described, the portion of the instrument which simultaneously computes and algebraically totalizes the separate moments exerted by these weights may be the next logical subject of consideration.

This moment computing and totalizing portion serves to compute the separate moments by multiplying a movement proportionate to the magnitude of each given weight by a constant proportionate to the distance at which said weight is located from the normal load center of the craft. The separately computed moments are concurrently totalized by differential displacement of a moment total registering element, but no direct visual indication of the magnitude of the totalized moments is provided for in the present instrument because it is significant only as a factor in the computation of the lineal displacement of the load center as hereinafter described.

The moment total registering element consists, in the illustrated embodiment of the invention, of a lever 125, most clearly shown in Figures 4, 5, and 6, which lever is pivotally mounted at 126 on the panel 10, and pivotally connected at 127 to an actuating lever 128.

In the particular craft for which the instrument illustrated and described herein was designed, the front fuel tanks are wing tanks, and their location with respect to the longitudinal axis of the craft is substantially coincident with that of the normal load center thereof. The mechanism actuated by movement of the knob 20 within the limits of scale 23, relating to the front fuel tanks, should not, therefore, displace the moment total registering lever 125 at all, and it will be noted, on reference to Figures 2 and 3, that the rack 92 actuated by this knob 20 has no direct connection with said lever 125 and that therefore no displacement of said lever will attend the adjustment of knob 20 within the limits of scale 23.

The rear fuel tanks, however, are located rearward of the normal load center of the craft, and a lost-motion connection is therefore provided between the rack 92 and mechanism for displacement the moment total registering lever 125 so that adjustment of knob 20 within the limits of scale 24, relating to the rear fuel tanks will effect proper proportionate displacement of said lever.

This lost-motion connection comprises a lever 130 (Figures 2 and 3) pivotally mounted at 131 on the panel 10, and normally held by a spring 132 against an eccentric stud 133 secured to the panel 10 by a screw 135 which may be loosened to permit rotational adjustment of the eccentric stud for the purpose of effecting adjustment of the limit position of lever 130. Stud 133 is so located with respect to the lower end of rack 92, that movement of knob 20 within the limits of scale 23, will not bring the lower end of rack 92 into contact with lever 130, but upon movement of knob 20 within the limits of scale 24, rack 92 is brought into contact with a stud 136 fixed to lever 130 so that all further clockwise movement of knob 20 effects clockwise rocking of lever 130 about its pivot 131.

Such movement of lever 130 is transmitted to the moment total registering element by means comprising a rod 137 pivotally connected at its lower end, at 138, to the left end of lever 130, and pivotally connected at its upper end, at 139, to a lever 140, whereby upon clockwise movement of lever 130, lever 140 is rocked clockwise about 142 as a fixed pivot. Pivotally connected to lever 140 at 143 is a link 144, the upper end of which is pivotally connected at 146 to a lever 147, whereby lever 147 is rocked clockwise about 148 as a fixed pivot. Pivotally connected to lever 147 at 150 is a link 151, the upper end of which is pivotally connected at 152 to the actuating lever 128 hereinbefore described, which in this operation is rocked clockwise about 153 (see Figure 4) as a fixed pivot, and through its pivotal connection 127 with the moment total registering lever 125 rocks the latter clockwise about its pivot 126. The lengths of the effective arms of the levers described are so proportioned that the differential displacement of lever 125 so brought about is proportional to the moment exerted by the rear fuel tank load about the normal load center of the craft.

For the purpose of effecting differential displacement of the moment total registering lever 125, in accordance with the moment exerted by the cargo load in the front cargo compartment, the rack 97 actuated by the knob 30 is connected to lever 125 by means comprising a rod 155 connected to said rack and pivotally connected at its upper end, at 156, to a lever 157, whereby upon clockwise movement of knob 30 lever 157 is rocked clockwise about 158 as a fixed pivot. Pivotally connected at 160 to lever 157 is a link 161, the upper end of which is pivotally connected at 162 to a lever 163 which in this operation is rocked counterclockwise about 164 as a fixed pivot. Pivotally connected to lever 163 at 166 is a link 167 the upper end of which is pivotally connected (see also Figure 4) to the actuating lever 128 which in this operation is rocked counterclockwise about 152 as a fixed pivot, and through its pivotal connection 127 with the moment total registering lever 125 rocks the latter counterclockwise about its pivot 126. The lengths of the effective arms of the levers described are so proportioned that the differential displacement of lever 125 so brought about is proportional to the moment exerted by the front cargo compartment load about the normal load center of the craft. It will also be noted that the direction of displacement of lever 125 in this operation is opposite to that described in connection with the rear fuel load.

In the craft for which the present instrument was designed, two cargo spaces are provided; one forward of the normal load center of the craft, and the other rearward thereof. Computation of the load center location under various load distributions is facilitated by arranging the computing mechanism relating to these cargo spaces so that the entire cargo load is registered by rotation of one of two knobs; in this case, the knob 30 just referred to. As has been described, this knob actuates both the weight totalizing and moment computing and totalizing mechanisms. The associated knob 35 (Figure 1) has no connection whatever with the weight totalizing mechanism, but actuates the moment computing and totalizing mechanism through leverages which are so proportioned that the differential displacement of the moment total registering lever 125 effected by adjustment thereof is proportional not only to the moment exerted by the rear cargo compartment load about the normal load center of the craft, but is also proportional to the decreased moment exerted by the front cargo compartment load previously set into the instrument by knob 30 minus the portion of that load indicated to have been moved to the rear cargo compartment by the setting of knob 35.

The connection between knob 35 and the moment total registering lever 125, for this purpose, comprises a shaft 170 extending through panel 10, knob 35 being secured to one end of said shaft and a pinion 171 being secured to the other end thereof and enmeshed with a rack 172, the arrangement corresponding in general to that described in connection with the other knobs. However, it will be noted that, as shown in Figures 2 and 3, the rack 172 is so located with respect to the pinion 171 that clockwise movement of the knob 35 will raise instead of lowering the rack. A rod 173 secured to rack 172 is pivotally connected at its upper end, at 164, to the lever 163, so that upon clockwise movement of knob 35, lever 163 will be rocked counterclockwise about 162 as a fixed pivot, rocking actuating lever 128 counterclockwise about 152 as a fixed pivot, and the moment total registering lever 125 clockwise on its pivot 126, all through the connections previously described.

The length of the effective arm of the lever 163 in this operation is such that lever 125 is moved clockwise more than an amount proportional to the magnitude of the rear cargo compartment load indicated by the position of knob 35 with respect to scale 37, the excess movement being proportionate to the decrease of the moment in the opposite direction effected by removal of an equal load from the front cargo compartment.

For the purpose of effecting differential displacement of the moment total registering lever 125 in accordance with the moment exerted by the passenger load, an additional rack 175 is provided, which meshes with the gear 102 on the side thereof opposite rack 103 so that when the knob 12 is set, rack 175 is displaced an amount equal to the displacement of rack 103, but in the opposite direction. Rack 175 is connected to lever 125 by means comprising a rod 176 connected to said rack and pivotally connected at its upper end, at 142, to the previously described lever 140, whereby upon clockwise movement of knob 12, lever 140 is rocked counterclockwise about 139 as a fixed pivot. Through the previously described connections comprising link 144, lever 147, link 151, actuating lever 128 and its pivotal connection 127 with the moment totaling registering lever 125, the latter is differentially adjusted in a clockwise direction.

Since all of the passenger weights delineated upon scales 14 and 15 cannot be placed at the same distance from the normal load center of the craft, means are provided for varying the rate at which lever 125 is displaced during the progressive advance of knob 12 with respect to those scales. In the particular craft for which the instrument herein illustrated and described was designed, the location of the front passenger seats is forward of the location of the normal load center of the craft, one row of seats is substantially coincident with the normal location of the load center, and the majority of the seats are rearward of the normal load center.

Therefore, when passengers are loaded first in the front seats and then progressively rearwardly, it is necessary for the movement transmitted to lever 125 by knob 12 to be initially decelerated in one direction, then substantially arrested during a part of the movement of knob 12, and finally to be gradually accelerated in the opposite direction.

When passengers are loaded first in the rear seats and then gradually forward, this situation is reversed, and during the same movement of knob 12, lever 125 must be first given a gradually decelerated movement in a direction opposite to that of its initial movement in the first case, then it must be substantially arrested during a part of the movement of knob 12 and finally it must be gradually accelerated in the opposite direction to that in which it was first moved.

When passengers are loaded first in the center seats and then equally in each direction toward the end seats the rate at which lever 125 is moved by knob 12 should be substantially uniform throughout the movement of the latter.

This progressive changing of the rate of movement of lever 125 by knob 12 is accomplished by means comprising a rod 180 (Figure 3) connected to the rack 103 and pivotally connected at its upper end at 181 to a link 182 pivotally mounted on the panel 10 at 183. Link 182 is pivotally connected at 184 to one end of a second link 185, forming a toggle linkage, the other end of which is pivotally connected at 186 to one link 187 of a scissors linkage pivotally mounted on the panel 10 at 188. The other elements of this scissors linkage include a second link 189 pivotally connected at 191 to the upper end of link 187 (see Figure 7), and a third link 192 pivotally connected to the link 189 at 193 and to a lever 195 at 194. Lever 195 is pivotally mounted on the panel 10 at 197, and its opposite end is pivotally connected at 198 to a rod 199, the upper end of which is pivotally connected to the lever 147 at 148.

Also pivotally connected at 193 to this scissors linkage 187, 189, 192 is a flexible rod 200, the opposite end of which is connected to a rack 202 which is movable, in the same manner previously described in connection with the other racks, by the knob 17 disposed on the face of panel 10.

When the knob 17 is set so that its indicator 18 points to "Center" on scale 19, the pivot 193 connecting links 189 and 192 of the scissors linkage is positioned by rack 202 and rod 200 so that the axis thereof is coaxial with the axis of the pivot 188. When this mechanism is so set, movement of the toggle linkage 182, 185 by knob 12 via rack 103 and rod 180 will not cause any movement of the lever 195, because all of the links of the scissors linkage 187, 189, 192 are of equal length between pivots, and the movement of the toggle linkage 182, 185 from the position in which it is shown in Figure 3 to the position in which it is shown in Figure 2, will merely oscillate scissors links 187 and 189 around the coaxial pivots 188 and 193 as a center, without imparting any movement to scissors link 192 and lever 195 connected thereto. Under such circumstances the movement of the moment totalizing lever by knob 12 will be uniform at all times during the adjustment of the latter.

When the knob 17 is set so that its indicator 18 points to "Front to Rear" on scale 19, the pivot 193 is displaced from coaxiality with the pivot 188 as shown in Figure 3. Under such circumstances downward movement of rack 103 from the position in which it is shown in Figure 3 will, as it straightens the toggle linkage 182, 185, rock the link 187 clockwise about its pivot 188 and, through link 189, will move pivot 193 downward, flexing rod 200 slightly. Downward movement of pivot 193, through link 192 and pivot 194, rocks lever 195 clockwise about pivot 197, and, through rod 199 lowers pivot 148.

It will be recalled that the transmission of movement from knob 12 to lever 125 is by way of rack 175, rod 176, lever 140, link 144, and lever 147 which rocks clockwise about pivot 148 as rack 175 is raised. The concurrent lowering of pivot 148 as above described, therefore decreases the movement transmitted from lever 147 to link 151 and actuating lever 128. During the first part of the movement of knob 12 the rate at which pivot 148 is thus lowered is sufficient to more than offset the movement transmitted to lever 147 via link 144 and pivot 150 is first lowered, then held stationary.

As the toggle linkage 182, 185 straightens, however, the rate at which pivot 148 is lowered progressively decreases and pivot 150 is raised by movement transmitted via link 144. When the toggle linkage is completely straightened, the lowering of pivot 148 ceases, and as the toggle linkage is displaced in the opposite direction, toward the position in which it is shown in Figure 2, pivot 148 is raised at an accelerating rate.

This raising of pivot 148 causes pivot 150 to be raised not only by the movement transmitted from knob 12 by way of link 144, but an additional amount proportionate to the amount by which pivot 148 is raised, and since the rate at which pivot 148 rises increases progressively during movement of the toggle linkage from straight position to the position in which it is shown in Figure 2, it will be seen that the rate at which lever 125 is moved progressively increases.

The arrangement described is therefore such that when knob 17 is set at "Front to Rear," the movement of knob 12 along its scale effects a reversal of the direction, followed by a gradually accelerated movement of the moment totalizing lever 125; when knob 17 is set at "Center" the movement of knob 12 along its scale effects a uniform proportionate movement of lever 125; and when knob 17 is set at "Rear to Front" exactly the reverse of the movement when it is set at "Front to Rear" takes place; i. e., movement of knob 12 effects a gradually decelerated movement of lever 125 followed by a reversal of the direction of movement. It will also be observed that a resetting of knob 17 from any of its indications to another will, at any time, effect the appropriate repositioning of lever 125 by raising or lowering pivot 148.

The lengths of the effective arms of all of the levers described in connection with this operation, are proportioned so that the differential displacement of lever 125 is proportional to the moments exerted by the passenger loads about the normal load center of the craft.

For the purpose of effecting differential displacement of the moment total registering lever 125 in accordance with the moment exerted by the oil load, rack 113 is pivotally connected at 204 (Figure 3) by a rod 205 to a lever 206, rockable about pivot 207. Lever 206 has pivotally connected thereto, at 208, a rod 209, the upper end of which is pivotally connected to lever 157 at 158. This arrangement is such that adjustment of the oil knob 25 effects a proportionate differential adjustment of lever 125 through connections comprising rod 205, lever 206, rod 209, lever 157, link 161, lever 163, link 167, actuating lever 128, and pivotal connection 127. The lengths of the effective arms of all of these levers are proportioned so that the differential displacement of lever 125 is proportional to the moment exerted by the oil load about the normal load center of the craft.

A normalizing adjustment of the moment total registering lever 125 necessary, for instance, when changes are made in the fixed equipment load, may be effected by adjustment of shaft 39 provided with a slotted head, as shown in Figure 1. This shaft is connected, by a pinion corresponding to that described in connection with the various setting knobs, to a rack 211, which in turn is connected to a rod 212, the upper end of which is pivotally connected at 207 to lever 206 and moves lever 125 through the connections above described in connection with the description of the oil knob.

The bell crank 80, which is directly connected to the pointer 40 and therefore constitutes a weight total registering element, having been set to a position representative of the total of the empty weight of the craft and the various weights making up its load, and the moment total registering element 125 having been set to a position representative of the algebraic total of the individual moments exerted by the various loads about the normal load center of the craft, all as above described, the mechanism for dividing the algebraic sum of these moments by the total of the weight in order to obtain an indication of the lineal displacement of the load center will be described.

The mechanism for performing this computation and indicating the quotient in lineal terms is shown in detail in Figures 5 and 6. Indicator 45 which is movable over scale 46 is fixedly mounted on an arbor 225 to which is also fixed an arm 226 pivotally connected at 227 to an actuating rod 228. Spring 230 tensioned between the arm 226 and a stud on the panel 10 urges the assembly in one direction eliminating any effect from back lash in the various connections.

The opposite end of rod 228 is pivotally connected at 231 to one element 232 of a scissors linkage comprising links 232, 233, and 234 of equal length between their pivot centers; link 232 being pivotally mounted on panel 10 at 236 and pivotally connected at 237 to the link 233 which is, in turn, pivotally connected at 238 to the link 234.

This scissors linkage is controlled and actuated by the weight total registering bellcrank 80 and the moment total registering lever 125 jointly. Bellcrank 80 is connected thereto by a link 240 pivotally connected to the bellcrank 80 at 241, and to the scissors linkage at the pivot 238 which also connects the links 233 and 234. Lever 125 is connected thereto by means comprising a rod 242, the upper end of which is pivotally connected to lever 125 at 243 and the lower end of which is pivotally connected at 244 to a lever 245 pivotally mounted on panel 10 at 246, which lever is, in turn, pivotally connected to link 234 of the scissors linkage at 247.

This arrangement is such that any variation in the moment total registration as represented by the positions of lever 125, in either direction, will rock lever 245 about its pivot 246, and, through links 234 and 233, will rock link 233 and the indicator 45 directly connected thereto. The extent to which indicator 45 will be displaced by a given rocking of lever 125 in this manner is dependent upon the positioning, by the weight total registering bellcrank 80, of the pivotal connection 238 between links 233 and 234. As the weight registration decreases, pivot 238 is moved toward coaxility with pivot 236 (they would be coaxial at a zero weight registration) and a given movement of lever 125 produces a greater movement of pointer 45 as this distance between pivots 236 and 238 is reduced.

Similarly, if the moment registration remains constant at a value other than zero and the weight total is changed, pointer 45 is repositioned accordingly, the parts being so proportioned that each successive doubling of the weight under such circumstances would indicate only half as much lineal displacement of the load center.

The instrument herein described is a preferred embodiment of my invention and clearly fulfills the objects stated hereinabove, but it will be apparent that many modifications are possible and desirable in designing specific instruments for various types of craft. The invention therefore is not to be considered as restricted to the form disclosed except in so far as is necessitated by the prior art and by the spirit of the appended claims.

I claim:

1. In a computer, first and second settable value entering devices, a member differentially adjustable to form a mechanical representation of a computed value, a first means controlled by said first device for effecting differential adjustment of said member, a second means for effecting differential adjustment of said member, means controlled by said first device and comprising movement reversing mechanism for actuating an element of said second means in opposite directions successively upon setting movement of said first device in a single direction, and means controlled by said second device for actuating an element of said second means.

2. In a computer, first and second settable value entering devices, a lever differentially adjustable to form a mechanical representation of a computed value, connections extending from adjacent one end of said lever to said first device for effecting differential adjustment of said lever upon setting movement of said device, means having an operating connection with said lever adjacent the opposite end thereof for effecting differential adjustment of said lever, mechanism comprising a toggle linkage having an operating connection with an element of said means, and an operating connection with said first device for actuating an element of said means in opposite directions upon setting movement of said first device in a single direction, and connections between said second device and an element of said means for actuating the latter upon setting movement of said second device.

3. In a computer, registering means including a value entering device settable through a predetermined range, computing means including an element differentially adjustable to form a mechanical representation of a computed value, means controlled by said value entering device during setting thereof through a portion only of said predetermined range for actuating said computing means, means effective during setting of said value entering device through a portion of said predetermined range for superseding the control of said computing means by said actuating means, and result registering mechanism controlled jointly by said registering means and said computing means.

4. In a computer, registering means including a value entering device settable through a predetermined range, reversibly operable computing means including an element differentially adjustable to form a mechanical representation of a computed value, spring means for operating said computing means in one direction, stop means for limiting the extent of operation of said computing means by said spring means, means engageable by a portion of said registering means only after movement of said value entering device through a portion of said predetedmined range for operating said computing means in the opposite direction, and result registering mechanism controlled jointly by said registering means and said computing means.

5. In a computer, a plurality of means for registering separate values occurring in a mathematical equation, means comprising an adjustable value entering device common to said plurality of registering means for simultaneously entering values in said plurality of registering means, and means responsive to one portion of said value entering means upon the entry of a value in one of said registering means thereby for actuating another portion of said value entering means in opposite directions upon movement of said portion of said valve entering means in a single direction to vary the value entered in another of said registering means by said last mentioned portion of said value entering means in corresponding opposite directions.

6. In a computer, a plurality of means for registering separate values occurring in a mathematical equation, means comprising an adjustable value entering device common to said plurality of registering means for simultaneously entering values in said plurality of registering means, and means responsive to one portion of said value entering means upon the entry of a value in one of said registering means thereby for actuating another portion of said value entering means in opposite directions upon movement of said portion of said value entering means in a single direction to vary the value entered in another of said registering means by said last mentioned portion of said value entering means in corresponding opposite directions; said actuating means including a portion selectively adjustable to alter the magnitude of the variation in value entered in said other registering means by a given adjusting movement of said value entering device, and means comprising a second adjustable device for selectively adjusting the selectively adjustable portion of said actuating means.

7. In a computer, a plurality of means for registering separate values occurring in a mathematical equation, means comprising an adjustable value entering device common to said plurality of registering means for simultaneously entering values in said plurality of registering means, and means responsive to one portion of said value entering means upon the entry of a value in one of said registering means thereby for actuating another portion of said value entering means in opposite directions upon movement of said portion of said value entering means in a single direction to vary the value entered in another of said registering means by said last mentioned portion of said value entering means in corresponding opposite directions; said actuating means including a portion selectively adjustable to reverse the sign character of the variation in value entered in said other registering means by a given adjusting movement of said value entering device, and means comprising a second adjustable device for selectively adjusting the selectively adjustable portion of said actuating means.

8. In a computer, a plurality of means for registering separate values occurring in a mathematical equation, means comprising an adjustable value entering device common to said plurality of registering means for simultaneously entering values in said plurality of registering means, and means responsive to one portion of said value entering means upon the entry of a value in one of said registering means thereby for actuating another portion of said value entering means in opposite directions upon movement of said portion of said value entering means in a single direction to vary the value entered in another of said registering means by said last mentioned portion of said value entering means in corresponding opposite directions; said actuating means including a portion selectively adjustable between indicated limit positions to reverse the sign character of the variation in value entered in said other registering means by a given adjusting movement of said value entering device, and to an indicated intermediate position to render said valve entering device ineffective to vary the value entered in said another of said registering means, and means comprising a second adjustable device for selectively adjusting the selectively adjustable portion of said actuating means.

LEWIS W. IMM.